United States Patent [19]
Inoue

[11] Patent Number: 5,221,955
[45] Date of Patent: Jun. 22, 1993

[54] DISTANCE MEASURING APPARATUS FOR CAMERA

[75] Inventor: Akira Inoue, Tokyo, Japan

[73] Assignee: Olympus Optical Co., Ltd., Tokyo, Japan

[21] Appl. No.: 935,526

[22] Filed: Aug. 25, 1992

[30] Foreign Application Priority Data

Aug. 29, 1991 [JP] Japan .................................. 3-218827
Aug. 29, 1991 [JP] Japan .................................. 3-218828

[51] Int. Cl.⁵ ........................... G01C 3/00; G01C 5/00; G03B 3/00
[52] U.S. Cl. ........................................ 356/1; 354/403; 356/4
[58] Field of Search ........................ 356/1, 4; 354/403

[56] References Cited
U.S. PATENT DOCUMENTS

| | | |
|---|---|---|
| 4,582,424 | 4/1986 | Kawabata . |
| 4,648,710 | 3/1987 | Ban et al. ................. 356/4 |
| 4,688,919 | 8/1987 | Ogawa et al. .......... 354/403 |
| 4,764,786 | 8/1988 | Tamura et al. ......... 354/403 |
| 4,814,810 | 3/1989 | Ishiguro .................. 356/1 |

FOREIGN PATENT DOCUMENTS

| | | |
|---|---|---|
| 59-762 | 1/1984 | Japan . |
| 60-256112 | 12/1985 | Japan . |
| 1-217425 | 8/1989 | Japan . |
| 3-2245 | 1/1991 | Japan . |
| 3-2611 | 1/1991 | Japan . |

Primary Examiner—Stephen C. Buczinski
Attorney, Agent, or Firm—Frishauf, Holtz, Goodman & Woodward

[57] ABSTRACT

In an AFIC, an integration output $1/D_S$ of the ratio calculation and light amount integrating output $i_{SS}/A_S$ which are respectively dependent on the ratio and sum of signal currents derived from the electrodes of a pair of PSDs when a spot light emitting section of an IRED is activated are derived. Further, an integration output $1/D_M$ of the ratio calculation and light amount integrating output $i_{SM}/A_M$ which are respectively dependent on the ratio and sum of signal currents derived from the electrodes of the pair of PSDs when the spot and area light emitting sections of the IRED are activated are derived. Then, an arithmetic device derives a distance to a subject based on the four outputs. Alternatively, the arithmetic device compares the integration outputs of the ratio calculation and determines the distance to the subject by selectively effecting the distance deriving calculation based on the integration output of the ratio calculation when the spot light emitting section is activated, the distance deriving calculation based on the integration output of the ratio calculation when the spot and area light emitting section are activated, and the distance deriving calculation based on the above four outputs according to the result of comparison.

22 Claims, 13 Drawing Sheets

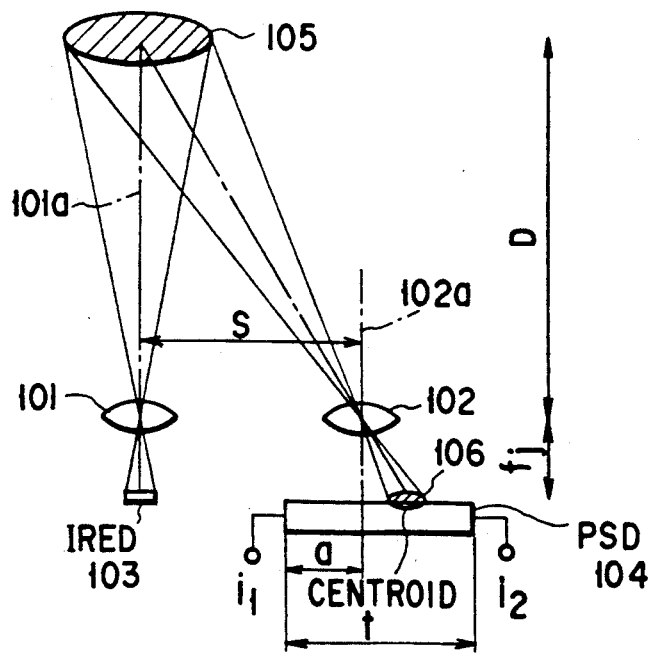
(PRIOR ART)
FIG. 1
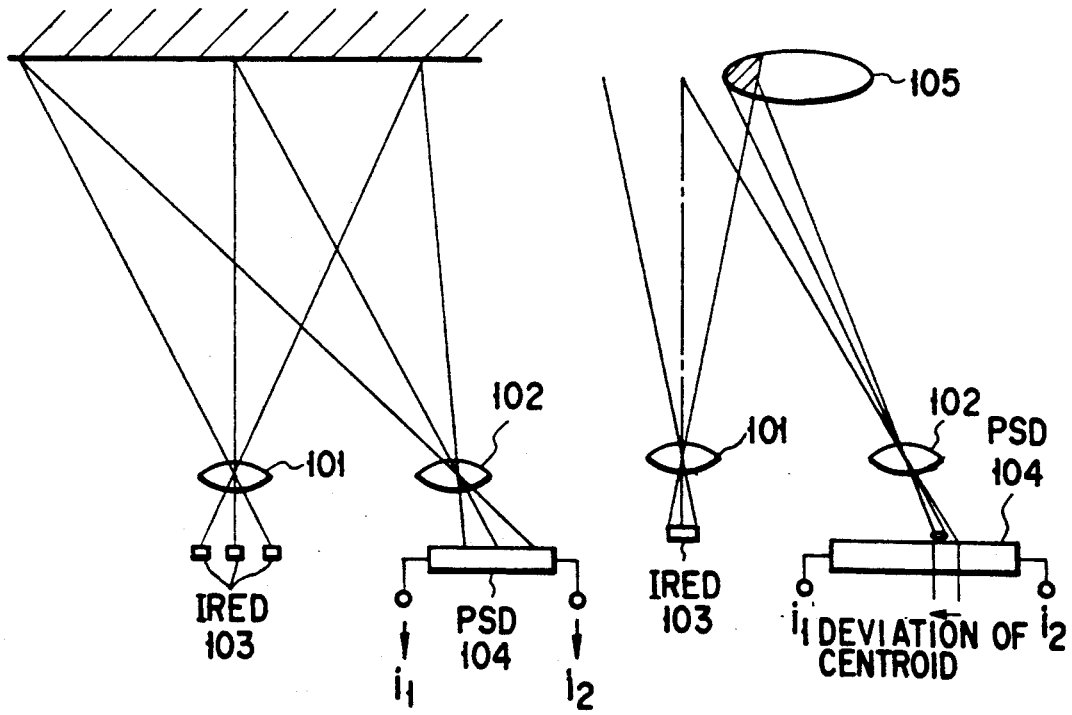
(PRIOR ART)
FIG. 2A
(PRIOR ART)
FIG. 2B

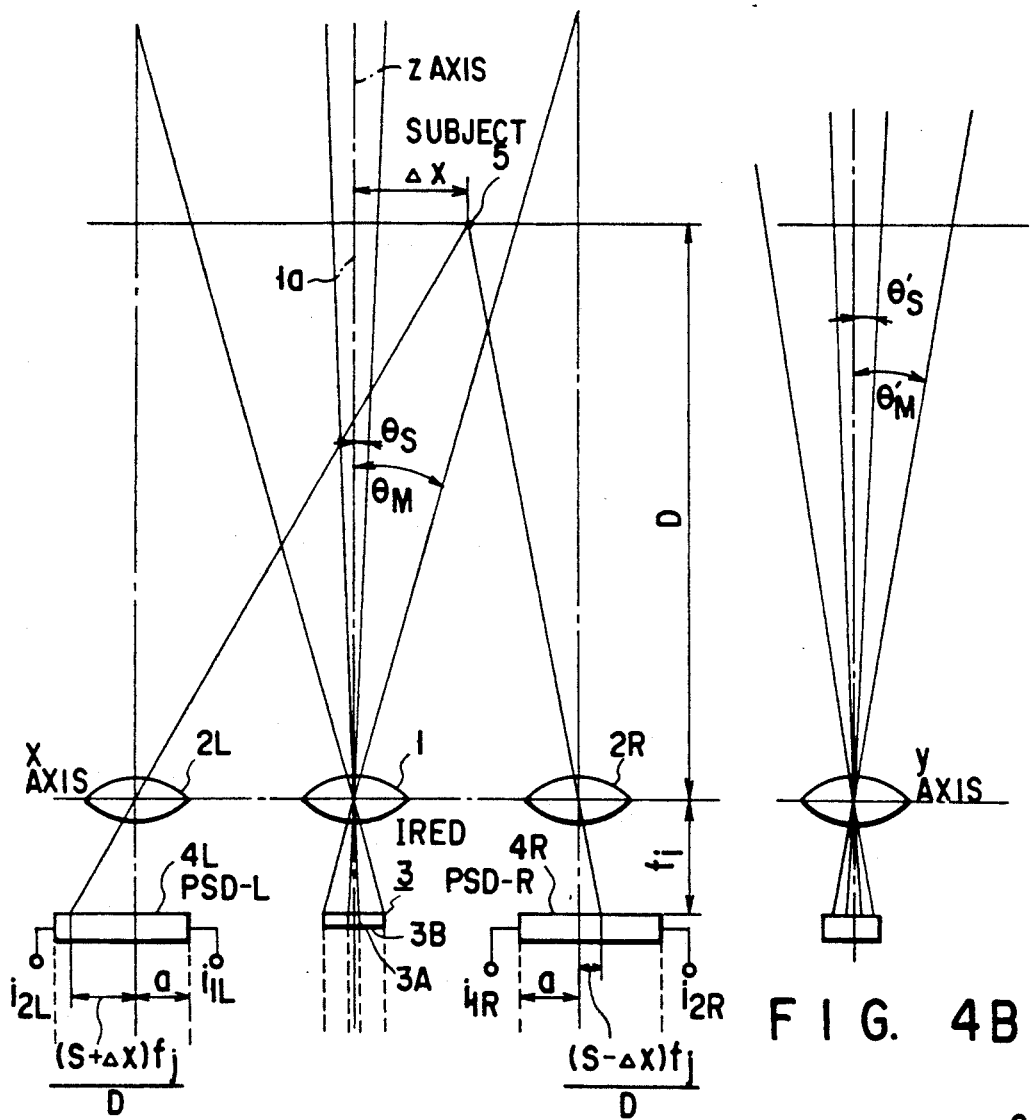
FIG. 4A
FIG. 4B
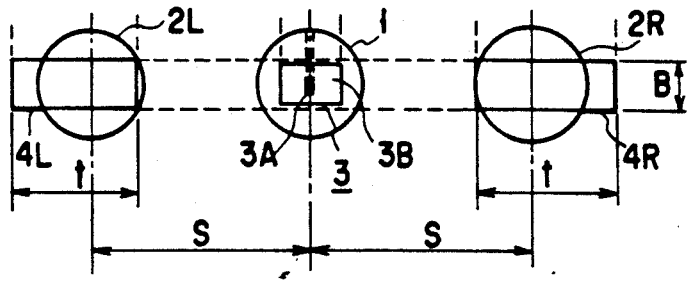
FIG. 4C
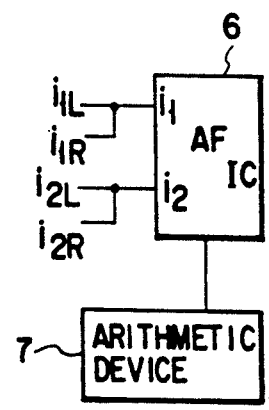
FIG. 4D

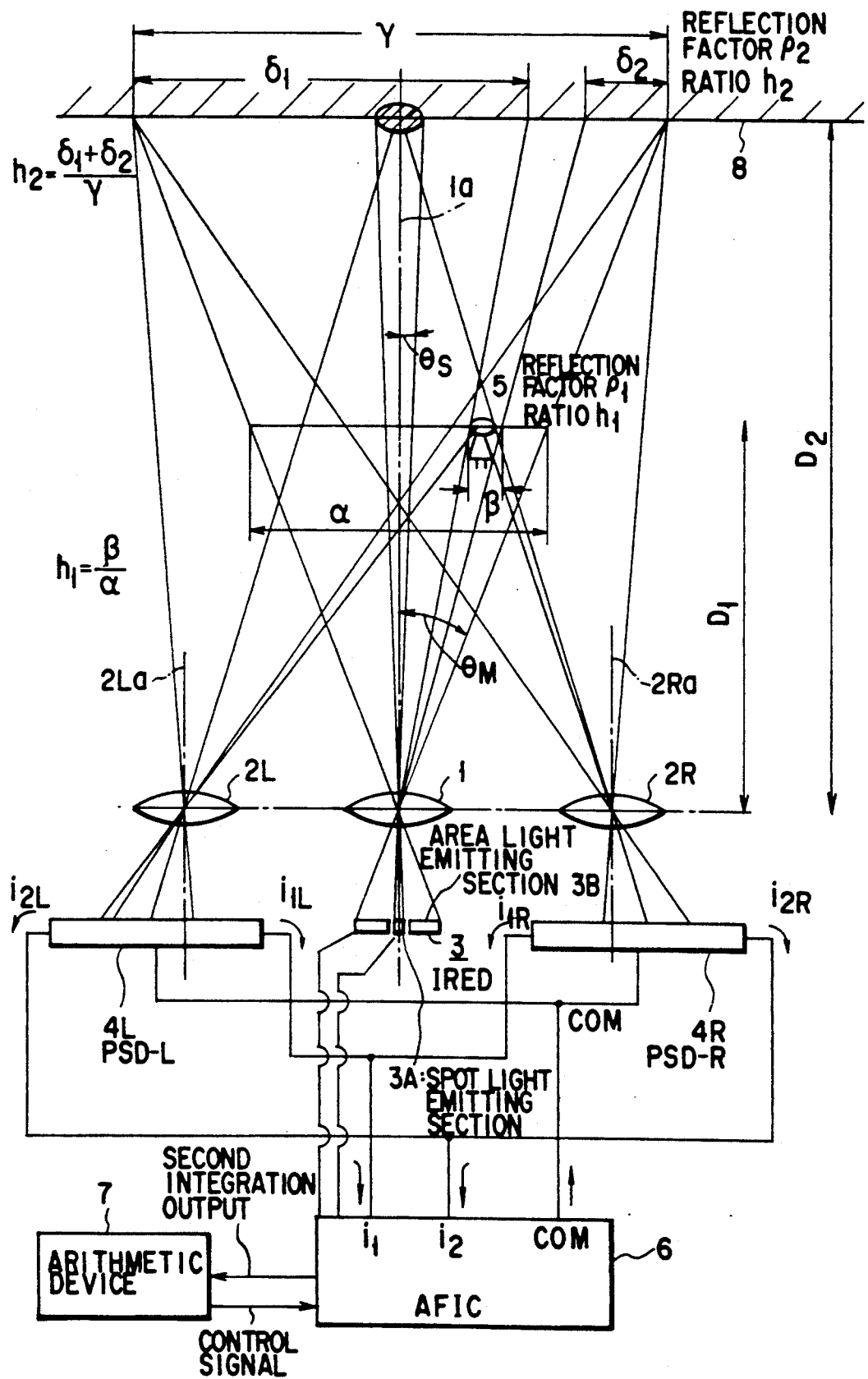
F I G. 5

$D_1 = 2m \quad \rho_1 = 0.4 \quad D_2 = 4m \quad \rho_2 = 0.6 \quad$ HYPOTHETICAL $h_2 = 0.5$

| ACTUAL $h_2$ | 0.9 | 0.8 | 0.7 | 0.6 | 0.5 | 0.4 | 0.3 | 0.2 | 0.1 | 0 |
|---|---|---|---|---|---|---|---|---|---|---|
| $1/D_M$ | 0.304 | 0.350 | 0.384 | 0.410 | 0.432 | 0.450 | 0.465 | 0.479 | 0.490 | 0.5 |
| $D_{Mm}$ | 3.29 | 2.85 | 2.61 | 2.44 | 2.31 | 2.22 | 2.15 | 2.09 | 2.04 | 2.0 |
| $1/D_X$ | 0.350 | 0.410 | 0.450 | 0.478 | 0.5 | 0.516 | 0.530 | 0.541 | 0.550 | 0.557 |
| $D_X$ | 2.86 | 2.44 | 2.22 | 2.09 | 2.00 | 1.94 | 1.89 | 1.85 | 1.82 | 1.79 |
| $\Delta(\frac{1}{D}) = \frac{1}{D_X} - \frac{1}{D_1}$ | −0.15 | −0.09 | −0.05 | −0.022 | 0 | 0.016 | 0.030 | 0.041 | 0.050 | 0.057 |

FIG. 8

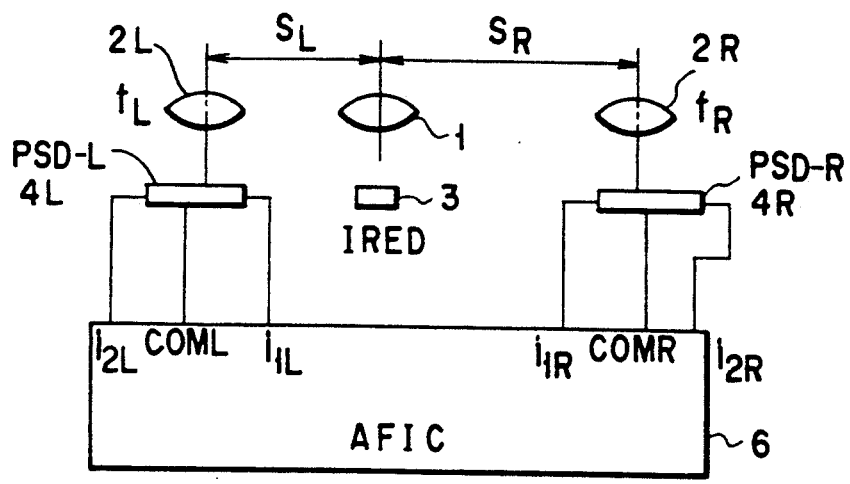
F I G. 15

DISTANCE MEASURING APPARATUS FOR CAMERA

BACKGROUND OF THE INVENTION

1. Field of the Invention

This invention relates to an active distance measuring apparatus for camera, and more particularly to distance measurement in a wide visual field.

2. Description of the Related Art

As shown in FIG. 1, the conventional distance measuring apparatus is constructed by light projection and reception lenses 101 and 102 having two optical axes which are separated by a preset base length (S), a light projection IRED (near infrared light emitting diode) 103, and a PSD (position sensing device) 104 for light reception having a length t.

The PSD 104 is disposed such that the end face thereof may be set at a distance a from the optical axis 102a of the reception lens 102. In this arrangement, the centroid of a reflected spot 106 from a subject 105 is set on a position at a distance of $[(Sf_j/D)+a]$ from the end face of the PSD 104 where D indicates a distance to the subject and $f_j$ indicates the focal distance of the light reception lens 102. Since the PSD 104 generates a current output corresponding to the position of the reflected spot 106, the following equation (1) can be obtained if one end portion of the PSD 104 which lies near the light projection lens 101 is used as a first electrode (1 ch), the other end portion thereof is used as a second electrode (2 ch), and output variation currents caused in the respective portions when the projection IRED 103 has emitted light are $i_1$ and $i_2$.

$$\frac{i_2}{i_1 + i_2} = \frac{\frac{Sf_j}{D} + a}{t} \quad (1)$$

The following equation (2) can be obtained by rewriting the equation (1).

$$\frac{1}{D} = \frac{i_2}{i_1 + i_2} \times \frac{t}{Sf_j} - \frac{a}{Sf_j} \quad (2)$$

Therefore, the reciprocal 1/D of the distance to the subject can be obtained by calculating $[i_2/(i_1+i_2)]$ by use of the currents $i_1$ and $i_2$ according to the equation (2).

In the example of FIG. 1, the distance to only one subject 105 disposed at the center can be measured. However, it is possible to use a plurality of IREDs 103 having different optical axes as in a three-point distance measuring device as shown in FIG. 2A which is also similar to that which is disclosed in published Examined Japanese Patent Application (PEJPA) NO. 3-2245, for example.

When the three-point distance measurement is effected as shown in FIG. 2A, no problem will occur if the entire portion of the spot of the IRED 103 is projected on the subject, but if part of the spot is not projected onto the subject as shown in FIG. 2B (that is, a so-called spot eclipse occurs), the centroid of the reflected spot image on the PSD 104 is deviated from that obtained when the entire spot is reflected. As a result, the distance to the subject will be erroneously measured.

As a measure for coping with the spot eclipse, a binocular AF (automatic focusing) method as shown in FIG. 3 is proposed.

The AF is effected by symmetrically disposing two light reception lenses 102L and 102R with respect to the optical axis 101a of the projection lens 101 at a distance of base length S from the optical axis 101a and symmetrically disposing two PSDs 104 (PSD-L 104L and PSD-R 104R) with respect to the optical axis 101a at the distance of base length S from the optical axis 101a. In this case, output currents of PSD-L and PSD-R are respectively indicated by $i_{1L}$, $i_{2L}$, $i_{1R}$ and $i_{2R}$. If the spot eclipse occurs and the centroid of the subject 105 is deviated from the optical axis 101a of the projection lens 101 by x, the relations between the reflected spot positions of the right and left PSDs and the output currents can be expressed by the following equations (3).

$$PSD\text{-}L \frac{i_{2L}}{i_{1L} + i_{2L}} = \frac{\frac{(S + \Delta x)}{D} f_j + a}{t} \\ PSD\text{-}R \frac{i_{2R}}{i_{1R} + i_{2R}} = \frac{\frac{(S - \Delta x)}{D} f_j + a}{t} \quad (3)$$

The following equations (4) can be obtained by connecting the 1-ch portions and 2-ch portions of the right and left PSDs together, and setting the respective output currents to $i_1$, $i_2$.

$$i_1 = i_{1L} + i_{1R}, \quad i_2 = i_{2L} + i_{2R} \quad (4)$$

In this case, since the right and left PSDs are disposed to detect the same subject 105, the following equation (5) can be obtained.

$$i_{1L} + i_{2L} = i_{1R} + i_{2R} \quad (5)$$

The following equation (6) can be derived based on the equations (3), (4) and (5) and the distance D to the subject can be determined independently from $\Delta x$ as shown in FIG. (6).

$$\frac{i_2}{i_1 + i_2} = \frac{\frac{Sf_j}{D} + a}{t} \quad (6)$$

However, in the three-point AF (FIG. 2A) described before, when the subject 105 lies in a position other than the three points, for example, a position between the beams, the distance cannot be measured. That is, when none of the projected beams are applied to the subject 105, a so-called spot eclipse occurs and the distance to the subject may be erroneously determined.

In contrast, the binocular AF (FIG. 3) described before can effectively cope with the spot eclipse but it has a defect that the distance cannot be measured in a wide range. That is, if the projection angle of the IRED 103 is increased to measure the distance in a wide range in the AF shown in FIG. 3, the distance to the subject may be erroneously determined by the influence due to something (such as a wall behind a human) other than the main subject.

SUMMARY OF THE INVENTION

This invention has been made in view of the above fact, and an object of this invention is to provide a distance measuring apparatus capable of eliminating the influence by the spot eclipse and measuring the distance in a wide visual range.

According to this invention, there is provided a distance measuring apparatus comprising light projection means for selectively setting into a first light emitting state for projecting light onto an area of relatively narrow range and a second light emitting state for projecting light onto an area of a range which is wider than the range of the first light emitting state; a pair of optical position detecting means arranged with the light projecting means disposed therebetween, each of the optical position detecting means including a pair of electrodes and outputting signal currents corresponding to the incident position of light which has been projected and reflected from a subject; and distance deriving means for deriving the distance $(1/D_1)$ to the subject according to the equation of $[1/D_1=\{(1/DM)-(k/D_S)\}/(1-k)]$ (where $k=(i_{SS}/A_S)(A_M/i_{SM})h_2$, $A_S$ and $A_M$ are constants, and $h_2$ is the ratio of an area occupied by the subject with respect to the entire illuminated range) based on a value $(1/D_S)$ dependent on the ratio of the signal currents derived from the electrodes of the optical position detecting means and a value $(i_{SS})$ dependent on the sum of the signal currents in the first light emitting state and based on a value $(1/D_M)$ dependent on the ratio of the signal currents derived from the electrodes of the optical position detecting means and a value $(i_{SM})$ dependent on the sum of the signal currents in the second light emitting state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing the optical arrangement of the conventional distance measuring apparatus;

FIG. 2A is a diagram showing the optical arrangement in the conventional three-point distance measuring apparatus and FIG. 2B is a diagram for illustrating the spot eclipse;

FIG. 4A is a plan view showing the optical arrangement of the basic construction of a distance measuring apparatus according to this invention, FIG. 4B is a side view thereof, FIG. 4C is a front view, and FIG. 4D is a diagram showing the circuit construction;

FIG. 5 is a diagram showing the construction of a first embodiment of this invention;

FIG. 8 is a table showing the possibility of erroneous determination of distance caused by variation in actual $h_2$;

FIG. 15 is a view showing another modification of the optical arrangement.

DETAILED DESCRIPTION OF THE PREFERRED EMBODIMENTS

Figure 3:
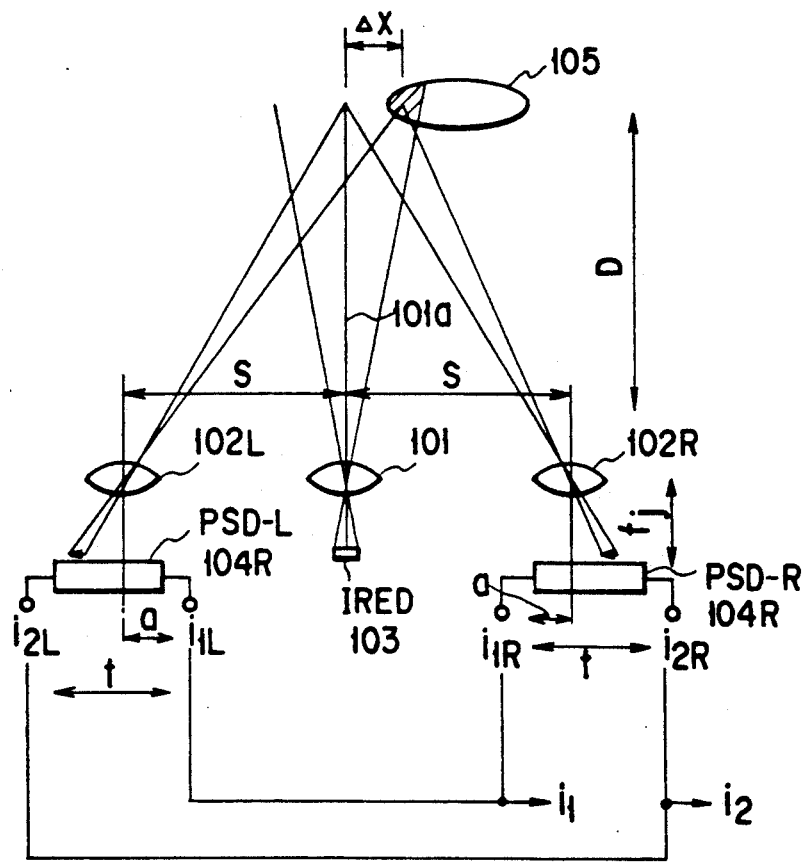
FIG. 3 is a diagram showing the optical arrangement in the conventional binocular distance measuring apparatus.

First, the concept of this invention is described before explaining the embodiment of this invention so that this invention can be easily and better understood.

FIGS. 4A to 4D show the basic construction of a distance measuring apparatus of this invention, and FIG. 4A is a plan view, FIG. 4B is a side view, FIG. 4C is a front view and FIG. 4D shows the circuit construction.

The distance measuring apparatus of this invention is a binocular AF type distance measuring apparatus having two light reception lenses and two PSDs (position sensing devices). That is, the reception lenses 2L and 2R are symmetrically arranged with respect to the optical axis 1a of a light projection lens 1 at a distance of base length S from the optical axis 1a.

An IRED (near infrared light emitting diode) 3 is divided into a section (spot light emitting section) 3A for projecting light on a small area near and around the optical axis 1a of the projection lens 1 and a section (area light emitting section) 3B for projecting light on a larger area around the optical axis 1a. The area light emitting section 3B is constructed to surround the spot light emitting section 3A.

Like the reception lenses 2L and 2R, the PSDs 4 (PSD-L 4L and PSD-R 4R) are also symmetrically arranged with respect to the optical axis 1a of the projection lens 1. In this case, output currents of the PSD-L and PSD-R are respectively set to $i_{1L}$, $i_{2L}$, $i_{1R}$, and $i_{2R}$. The output currents $i_{1L}$, $i_{2L}$, $i_{1R}$, and $i_{2R}$ of the PSD L and PSD-R have the relations expressed by the equation (3) when the spot eclipse occurs and the centroid of the subject 5 is deviated from the optical axis 1a of the projection lens 1 by $\Delta x$.

The 1-ch output currents $i_{1L}$ and $i_{1R}$ of the PSD-L and PSD-R are input to and processed by an AFIC (automatic focusing integrated circuit) 6 as $i_1$ because the 1-ch portions of the right and left PSDs are connected together. Likewise, the 2-ch output currents $i_{2L}$ and $i_{2R}$ of the right and left PSDs are input to and processed by the AFIC 6 as $i_2$. The AFIC 6 is also used to drive the IRED 3.

With the above construction, the AFIC 6 drives only the spot light projecting section 3A in the first distance measuring cycle to derive a distance $1/D_S$ to the subject (this process is hereinafter referred to as a ratio calculation) and derive a reflection amount $i_{SS}/A_S$ (this process is hereinafter referred to as a light amount integration). Next, in the second distance measuring cycle, it drives both of the spot light projecting section 3A and the are light projecting section 3B to derive a distance $1/D_M$ to the subject and reflection amount $i_{SM}/A_M$.

Then, an arithmetic device 7 uses the above four variables (that is, distance $1/D_S$ to the subject, reflection amount $i_{SS}/A_S$, distance $1/D_M$ to the subject, and reflection amount $i_{SM}/A_M$) and derives a corrected distance $1/D_X$ to the subject according to the following equation (7) (this process is hereinafter referred to as a range increasing in the X-axis direction).

$$\frac{1}{D_x} = \frac{\frac{1}{D_M} - \frac{k}{D_M}}{1 - k} \qquad (7)$$

where $$k = \frac{i_{SS}}{A_S} \cdot \frac{A_M}{i_{SM}} \cdot h_2$$

and $h_2$: is a constant.

The range is increased in the Y-axis direction by increasing the width W of the PSD.

Further, before directly deriving $1/D_X$, the distance to the subject may be derived by using a value selected as follows according to the result of comparison of $1/D_S$ and $1/D_M$.

when $\frac{1}{D_S} - \frac{1}{D_M} > \Delta$, $\frac{1}{D_S}$ is used.

when $\left| \frac{1}{D_S} - \frac{1}{D_M} \right| < \Delta$, the average value of $\frac{1}{D_S}$ and $\frac{1}{D_M}$ is used.

When $\frac{1}{D_S} - \frac{1}{D_M} < -\Delta$, that is, when $\frac{1}{D_M} - \frac{1}{D_S} > \Delta$, $\frac{1}{D_X}$ is derived and used.

In this case, $\Delta$ is value corresponding to 1m.

There will now be described embodiments of this invention with reference to the accompanying drawings.

FIG. 5 is a diagram showing the construction of a first embodiment of this invention. A light projection lens 1 has a focal distance $f_t$, effective diameter $d_t$, and F number $F_t = f_t/d_t$. Light receiving lenses 2L and 2R each have a focal distance $f_j$, effective diameter $d_j$, and F number $F_j = f_j/d_j$. The light receiving lenses 2L and 2R have parallel optical axes 2La and 2Ra which are symmetrically arranged with respect to the optical axis 1a of the projection lens 1 at a distance of base length S from the optical axis 1a of the projection lens 1.

A light projection IRED 3 is disposed with its center set in alignment with the optical axis 1a of the projection lens 1. The IRED 3 includes a spot light emitting section 3A for illuminating an area only near and around the optical axis 1a of the projection lens 1 and an area light emitting section 3B for illuminating a larger area. Half angle of the illumination angle of the spot light emitting section 3A with respect to the horizontal direction is $\theta_S$ and half angle of the illumination angle of the area light emitting section 3B with respect to the horizontal direction is $\theta_M$. As shown in FIG. 4B, half angles of the respective illumination angles of the spot and area light emitting sections 3A and 3B with respect to the vertical direction are $\theta_S'$ and $\theta_M'$.

Two PSDs, that is, left PSD (PSD-L) 4L and right PSD (PSD-R) 4R are arranged. The PSDs are symmetrically disposed with respect to the optical axis 1a of the projection lens 1. Each of them has a length t and a width W and set in position deviated by a from the optical axis of a corresponding one of the reception lenses 2L and 2R. In each of the PSDs, an output terminal near the IRED 3 is referred to as a first channel (1 ch) and an output terminal farther from the IRED 3 is referred to as a second channel (2 ch). The PSDs 4L and 4R further include a common electrode terminal COM.

A subject 5 is disposed at a distance $D_1$ from the projection lens 1, the reflection factor with respect to the IRED 3 is set to $\rho_1$, and the ratio of the area thereof to the light projected area when light is projected by use of both of the spot and area light projecting sections 3A and 3B is set to $h_1$. There is a wall 8 behind the subject 5. The wall 8 is disposed at a distance $D_2$ from the projection lens 1, the reflection factor with respect to the IRED 3 is set to $\rho_2$, and the ratio of the area thereof to the light projected area is set to $h_2$ (therefore, $h_1 + h_2 = 1$).

The AFIC 6 has an $i_1$ input terminal, $i_2$ input terminal and COM output terminal. The terminals are respectively connected to the 1-ch terminals, 2-ch terminals and COM terminal of the PSD-L and PSD-R. The AFIC 6 outputs a time output (which is referred to as an integrated output of the ratio calculation) proportional to $i_2/(i_1 + i_2)$ as indicated by the equation (2) and a time output (which is referred to as a light amount integrating output) proportional to the sum $i_S(=i_1+i_2)$ of the 1-ch and 2-ch currents. Further, an IRED control signal is generated to cause the IRED 3 to emit light several times.

The arithmetic device 7 effects various arithmetic operations based on $i_2/(i_1+i_2)$ and $i_S$ which are derived by controlling the AFIC 6 to ultimately derive a lens moving amount.

Figure 6:
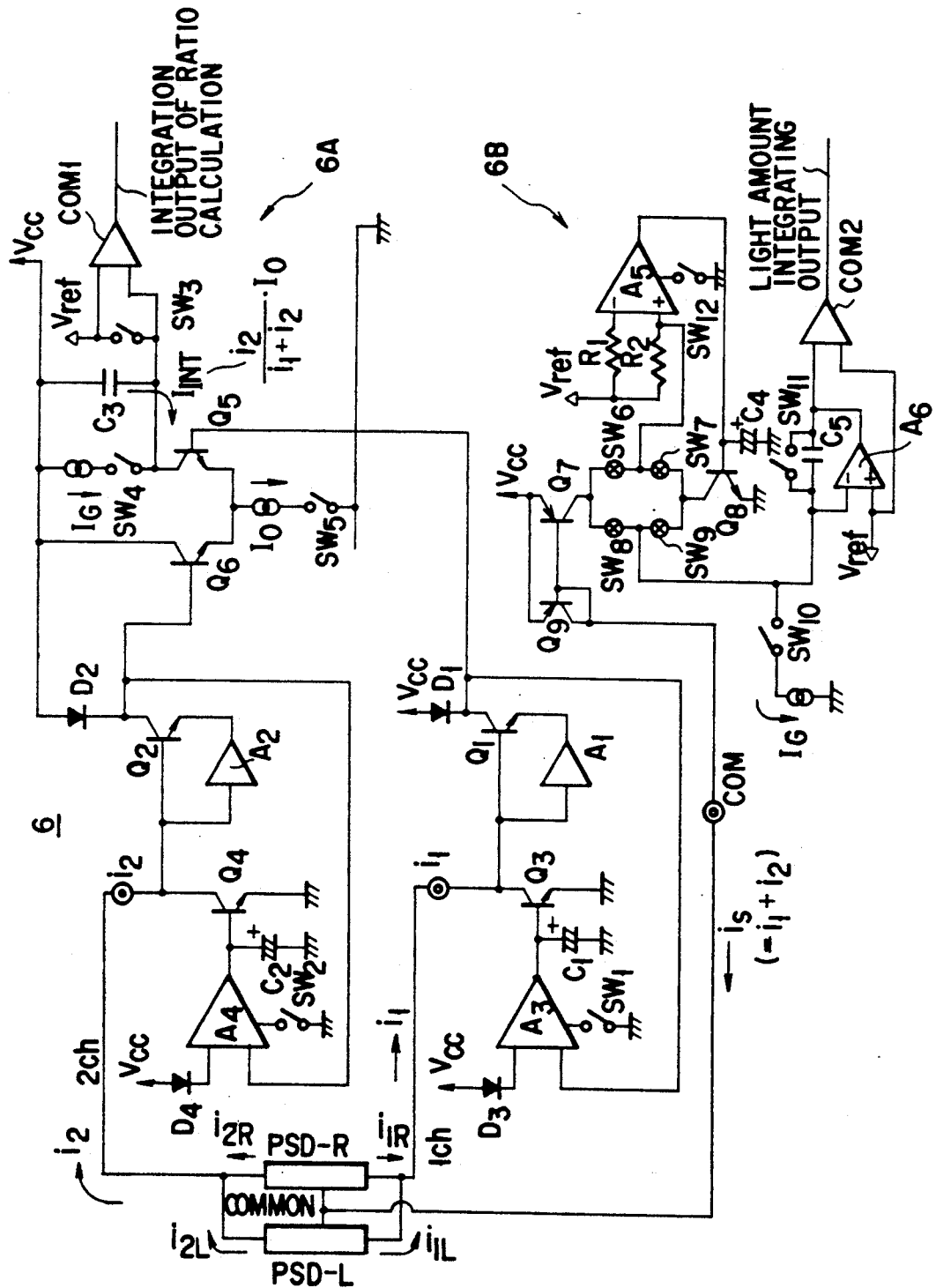
FIG. 6 is a diagram showing the circuit construction of an automatic focusing IC shown in FIG. 5.

FIG. 6 shows an internal circuit of the AFIC 6. The internal circuit shown in FIG. 6 is constructed by a ratio calculation circuit section 6A and an light amount integrating circuit section 6B.

First, the construction of the ratio calculation circuit section 6A is explained. Output currents of the two PSDs, that is, the PSD-L and PSD-R are input to the AFIC 6 with the 1-ch portions connected together and 2-ch portions connected together. The 1-ch and 2-ch input terminals $i_1$ and $i_2$ of the AFIC 6 are respectively connected to inputs of preamplifiers $A_1$ and $A_2$, collectors of transistors $Q_3$ and $Q_4$ in which the stationary photocurrent of PSD 4 flows, and bases of transistors $Q_1$ and $Q_2$) for amplifying a signal current (variation) generated at the time of light emission of the IRED 3.

The emitters of the signal current amplifying transistors $Q_1$ and $Q_2$ are respectively connected to outputs of the preamplifiers $A_1$ and $A_2$ and the collectors thereof are respectively connected to logarithm compression diodes $D_1$ and $D_2$. The cathodes of the diodes $D_1$ and $D_2$ are respectively connected to first input terminals of feedback amplifiers $A_3$ and $A_4$ to create stationary light storage feedback loops.

The second input terminals of the feedback amplifiers $A_3$ and $A_4$ are connected to diodes $D_3$ and $D_4$ to set up the same level as the bias points of the diodes $D_1$ and $D_2$. Outputs of the feedback amplifiers $A_3$ and $D_4$ are respectively connected to stationary light level storage capacitors $C_1$ and $C_2$ and the bases of the transistors $Q_3$ and $Q_4$. The amplifying operations of the feedback amplifiers $A_3$ and $A_4$, that is, whether the feedback of stationary light storage is effected or not can be controlled by means of switches $SW_1$ and $SW_2$.

The cathodes of the diodes $D_1$ and $D_2$ are connected to the bases of transistors $Q_5$ and $Q_6$ constituting a differential circuit. The emitters of the transistors $Q_5$ and $Q_6$ are connected together and connected to GND via a constant current source $I_O$ and a switch $SW_5$. The collector of the transistor $Q_6$ is directly connected to $V_{CC}$ and the collector of the transistor $Q_5$ is connected to $V_{CC}$ via an integration capacitor $C_3$. Further, the collector of the transistor $Q_5$ is connected to $V_{CC}$ via a switch $SW_4$ and a constant current source $I_G$ and connected to $V_{ref}$ via a switch $SW_3$. Further, the collector of the transistor $Q_5$ is connected to an input of a comparator COM1. The other input of the comparator COM1 is connected to $V_{ref}$ and an output thereof is output from the AFIC 6 to the exterior and supplied to the arithmetic circuit 7.

Next, the construction of the light amount integration circuit section 6B is explained.

The common terminal of the PSD-L and PSD-R is connected to the COM terminal of the AFIC 6 and connected to the collector of a transistor $Q_9$ which is diode-connected in the AFIC 6. The transistor $Q_9$ is connected to a transistor $Q_7$ to construct a current mirror circuit and the collector of the transistor $Q_7$ is connected to the collector of a stationary light storage transistor $Q_8$ via four analog switches $SW_6$ to $SW_9$ which are connected in a series-parallel fashion.

Two input terminals of a stationary light storage differential amplifier $A_5$ are connected to $V_{ref}$ via resistors $R_1$ and $R_2$ having the same resistance. One of the intermediate connection nodes of the series-parallel connected analog switches is connected to one of the two input terminals of the amplifier $A_5$. An output of the amplifier $A_5$ is connected to a stationary light storage capacitor $C_4$ and the base of the transistor $Q_8$. The other of the intermediate connection node of the series-parallel connected analog switches is connected to an input terminal of an integration amplifier $A_6$, integration capacitor $C_5$ and switch $SW_{10}$. The switch $SW_{10}$ is connected to GND via a constant current source $I_G$. The other end of the integration capacitor $C_5$ is connected input of a comparator COM2. The other of the inputs of the integration amplifier $A_6$ and the other of the inputs of the comparator COM2 are connected to $V_{ref}$.

Figure 7:
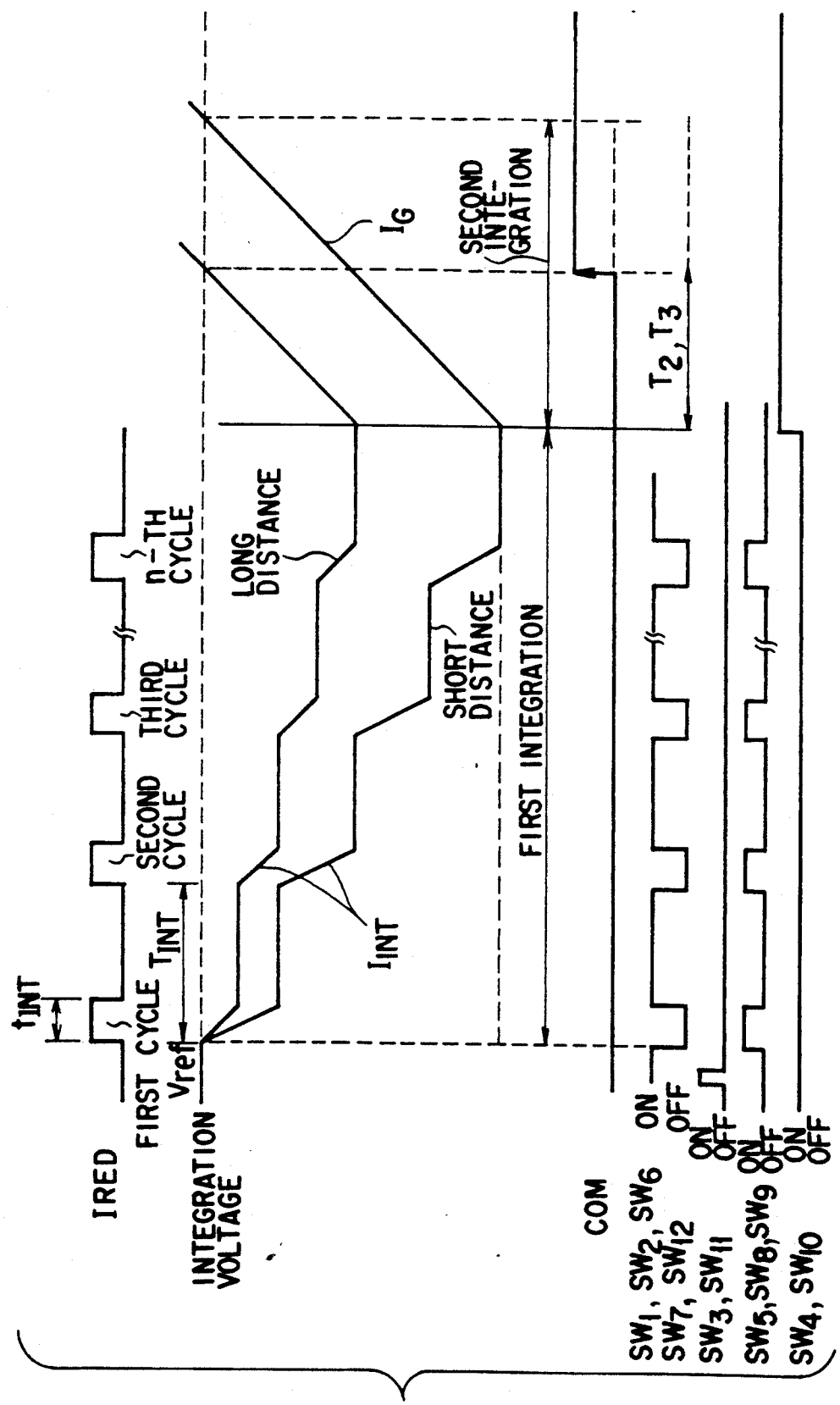
FIG. 7 is a flowchart for illustrating the operation of the automatic focusing IC shown in FIG. 6.

Next, the ratio calculation operation and light amount integrating operation are explained with reference to the timing chart shown in FIG. 7.

First, in the ratio calculating section 6A, the switch $SW_3$ is once turned on to set the potential of the integration capacitor $C_3$ equal to $V_{ref}$ before starting the light emitting operation by the IRED 3. Before the light emitting operation by the IRED, the switches $SW_1$ and $SW_2$ are turned on and the switch $SW_5$ is turned off to make the feedback loop active so that the stationary photo-current of the PSD 4 may be supplied to the transistors $Q_3$ and $Q_4$ and will not flow into the bases of the transistors $Q_1$ and $Q_2$. The capacitors $C_1$ and $C_2$ are charged to a voltage level corresponding to the stationary light level.

The switches $SW_1$ and $SW_2$ are turned off and the switch $SW_5$ is turned on in synchronism with the light emission by the IRED 3 so that the transistors $Q_3$ and $Q_4$ may permit only the stationary photo-current flowing before the light emission by the IRED to continuously flow. The photo-current caused in the IRED 3 by the reflected light from the subject 5 is divided into $i_1$ and $i_2$ according to the incident position on the PSD. The signal currents $i_1$ and $i_2$ are multiplied by $\beta$ (current amplification factor) by means of the amplifier transistors $Q_1$ and $Q_2$ and supplied to the diodes $D_1$ and $D_2$.

In this case, if a current flowing in the collector of the transistor $Q_5$ is $I_{INT}$, then the relation between the voltages of the diodes $D_1$ and $D_2$ and the transistors $Q_5$ and $Q_6$ may be expressed by the following equations (8) and (9).

$$V_T \ln \frac{\beta i_1}{I_S} + V_T \ln \frac{I_{INT}}{I_S} = V_T \ln \frac{\beta i_2}{I_S} + V_T \ln \frac{I_0 - I_{INT}}{I_S} \quad (8)$$

$$\therefore I_{INT} = \frac{i_2}{i_1 + i_2} I_0 \quad (9)$$

Therefore, a current proportional to $I_{INT}$, that is, $[i_2/(i_1+i_2)]$ flows into the capacitor $C_3$ and the potential thereof is gradually lowered.

The switches $SW_1$ and $SW_2$ are turned on again and the switch $SW_5$ is turned off in synchronism with termination of the light emission by the IRED 3 so that the feedback loop can be operated and the integrating operation of the integration capacitor $C_3$ will be terminated.

The IRED 3 effects the light emitting operation of light emission time $t_{INT}$ by n times at a preset interval $T_{INT}$ so as to repeatedly effect the above integrating operations n times. The operation described above is the first integrating operation.

Next, when the switch $SW_4$ is turned on, charges stored on the integration capacitor $C_3$ are discharged as the constant current $I_G$. Therefore, the potential of the integration capacitor $C_3$ linearly rises, and when it reaches $V_{ref}$, an output of the comparator COM1 is inverted.

The arithmetic device 7 determines the distance to the subject 5 by measuring a period of time $T_2$ from time when the switch $SW_4$ is turned on until an output of the comparator COM1 is inverted. The operation described above is the second integrating operation.

Since the amounts ($Q=CV=it$) of charged and discharged charges in the first and second integrating operations become equal to each other, the following equation (10) can be obtained by quantitatively analyzing the above operation.

$$I_{INT} \times T_{INT} \times n = I_G \times T_2 \quad (10)$$

The following equation (11) can be derived based on the equations (6), (9) and (10).

$$T_2 = nT_{INT} \frac{I_0}{I_G} \times \frac{i_2}{i_1 + i_2} \quad (11)$$

$$= \frac{nT_{INT}I_0}{iI_G} \left( \frac{Sf_j}{D} + a \right)$$

i/D is derived as follows.

$$\frac{1}{D} = \frac{1}{Sf_j} \left( \frac{T_2 I_G}{nT_{INT}I_0} - a \right) \quad (12)$$

That is, (distance to the subject)$^{-1}$ can be obtained by use of the time $T_2$ according to the equation (12).

Next, the operation of the light amount integrating circuit 6B is explained.

The signal current $i_S$ ($=i_1+i_2$) flowing from the COM terminal of the AFIC 6 into the common terminal of the PSD 3 can be expressed by the following equation (13).

$$i_S = \left( \frac{\pi \tau_i \tau_j}{2} \times \frac{dP_0}{d\Omega} \times \frac{R_p d_j^2}{4F_i^2 + 1} \right) \times \frac{\rho}{D^2} \quad (13)$$

where $\tau_i$ and $\tau_j$ are transmission factors of the projection and reception lenses 1, 2L and 2R, $dP_0/d\Omega$ is the projected light intensity [W/sr] of the IRED 3, Rp is the received light sensitivity [A/W] of the PSDs 4L and 4R, $d_j$ is the effective diameter of the light reception lenses 2L and 2R, $F_i$ is the F number of the projection lens 1, $\rho$ is the reflection factor of the subject, and D is the distance to the subject.

The above factors except $\rho$ and D are constants which can be determined by design and can be set to A, then the equation (13) can be rewritten as follows.

$$i_S = A \times \frac{\rho}{D^2} \quad (14)$$

$$\text{where } A = \frac{\pi \tau_i \tau_j}{2} \times \frac{dP_0}{d\Omega} \times \frac{R_p d_j^2}{4F_i^2 + 1}$$

Before the light emission by the IRED, the switch SW$_{11}$ is turned on at the same timing as the switch SW$_3$ to discharge the charges on the capacitor C$_5$. Further, since the switches SW$_6$ and SW$_7$ are turned on before the light emission by the IRED, the feedback loop by the amplifier A$_5$ is completed and a current supplied from the COM terminal of the AFIC 6 is equal to the collector current of the transistor Q$_7$ caused to flow by the current mirror circuit constructed by the transistors Q$_7$ and Q$_9$. The current flows via the switches SW$_6$ and SW$_7$ and serves as the collector current of the transistor Q$_8$. Charges dependent on the stationary photo-current are charged on the capacitor C$_4$.

The switches SW$_6$ and SW$_7$ are turned off, the switches SW$_8$ and SW$_9$ are turned on and the switch SW$_{12}$ is turned off in synchronism with the light emission by the IRED of the ratio calculation operation. Therefore, a stationary current flowing immediately before the light emission by the IRED flows into the transistor Q$_8$ via the transistor Q$_7$ and the switches SW$_8$ and SW$_9$. The signal current $i_S$ ($=i_1+i_2$) by the light emission by the IRED does not flow into the transistor Q$_8$ and charges the capacitor C$_5$. As a result, an output voltage of the amplifier A$_6$ is lowered again according to the value of $i_S$.

When the light emission by the IRED is interrupted, the switches SW$_6$, SW$_7$ and SW$_{12}$ are turned on again and the switches SW$_8$ and SW$_9$ are turned off so as to create the feedback loop.

The above operation is repeatedly effected n times. After this, when the switch SW$_{10}$ is turned on, charges charged on the capacitor C$_5$ are discharged as the constant current I$_G$. Therefore, the potential of the amplifier A$_6$ rises and when it reaches V$_{ref}$, an output of the comparator COM2 is inverted. The time T$_3$ from the turn-on of the switch SW$_{10}$ to the inversion of the output of the comparator COM2 is measured by the arithmetic device 7.

Like the former case, since the amounts of charged and discharged charges in the first and second integrating operations become equal to each other, the following equation (15) can be obtained by quantitatively analyzing the above operation.

$$i_S \times T_{INT} \times n = I_G \times T_3 \quad (15)$$

The following equations (16) and (17) can be derived based on the equations (14) and (15).

$$T_3 = \frac{AnT_{INT}}{I_G} \cdot \frac{\rho}{D^2} \quad (16)$$

$$\frac{\rho}{D^2} = \frac{I_G}{AnT_{INT}} \times T_3 \quad (17)$$

Therefore, if T$_3$ is derived, then the value of $\rho/D^2$ can be derived.

Further, $i_S$ can be derived based on T$_3$ by use of the following equation (15').

$$i_S = \frac{I_G}{nT_{INT}} T_3 \quad (15')$$

Next, an output of the AFIC 6 obtained in a case where both of the spot and area light emitting sections are driven to project light in a wide range $\theta_M$ and a plurality of subjects are disposed in the illuminated range is considered with reference to FIG. 5.

Assume that n subjects are disposed in the illuminated range of the IRED 3, the distance to the m-th subject is D$_m$, the reflection factor is $\rho_m$, and the ratio of the subjects to the entire illuminated range is h$_m$. In this case, the following equation can be obtained.

$$\sum_{m=1}^{n} h_m = 1$$

Signal currents $i_{1M}$ and $i_{2M}$ output from PSD-L and PSD-R are the total sums of signal currents caused by the subjects. Further, $i_{SM}$ is the sum of $i_{1M}$ and $i_{2M}$. Based on the sum signal, the AFIC 6 determines one of the subjects lies at the distance D$_M$. Therefore, the following equation (18) can be obtained based on the equations (6) and (14).

$$\frac{i_{2M}}{i_{1M} + i_{2M}} = \frac{i_{2M}}{i_{SM}} \quad (18)$$

$$= \frac{\sum_{m=1}^{n} i_{2Mm}}{\sum_{m=1}^{n} i_{SMm}}$$

$$= \frac{\sum_{m=1}^{n} \frac{1}{t}\left(\frac{Sf_j}{D_m} + a\right) A_M \frac{\rho_m}{D_m^2} h_m}{\sum_{m=1}^{n} A_M \frac{\rho_m}{D_m^2} h_m}$$

$$= \frac{1}{t}\left(\frac{Sf_j}{D_M} + a\right)$$

The following equation (19) can be obtained by rewriting the equation (18).

$$\frac{1}{D_M} = \frac{\sum_{m=1}^{n} \frac{\rho_m h_m}{D_m^3}}{\sum_{m=1}^{n} \frac{\rho_m h_m}{D_m^2}} \quad (19)$$

Next, consider a case as a simplified case wherein n=2 as shown in FIG. 5.

Assume that a person (subject 5) having the reflection factor $\rho_1$ is preset at the distance $D_1$ and the ratio of the area of the person to the entire illuminated area is $h_1$. A wall 8 having the reflection factor $\rho_2$ is disposed at a distance $D_2$ which is longer than $D_1$ and the ratio of the area of the wall is $h_2$ (where $h_1 + h_2 = 1$). In this case, the following equations (20) and (21) can be obtained by rewriting the equation (19).

$$\frac{1}{D_M} = \frac{\left(\frac{\rho_1 h_1}{D_1^3} + \frac{\rho_2 h_2}{D_2^3}\right)}{\left(\frac{\rho_1 h_1}{D_1^2} + \frac{\rho_2 h_2}{D_2^2}\right)} \quad (20)$$

$$= \frac{1}{D_M} - \frac{\frac{\rho_2 h_2}{D_2^2}}{\frac{\rho_1 h_1}{D_1^2} + \frac{\rho_2 h_2}{D_2^2}}\left(\frac{1}{D_1} - \frac{1}{D_2}\right) \quad (21)$$

In this case, the relation that $$\frac{\rho_1 h_1}{D_1^2} + \frac{\rho_2 h_2}{D_2^2} = \frac{i_{SM}}{A_M}$$

can be obtained since the following equation (22) can be derived from the equations (14) and (18).

$$i_{SM} = A_M\left(\frac{\rho_1 h_1}{D_1^2} + \frac{\rho_2 h_2}{D_2^2}\right) \quad (22)$$

The above operation is effected when both of the area and spot light emitting sections 3B and 3A are simultaneously driven. However, it is also possible to drive only the spot light emitting section 3A so as to effect the ratio calculation operation and light amount integrating operation, and in this case, $1/D_2$ can be determined by the following equation (23)

$$\frac{1}{D_S} = \frac{1}{D_2} \quad (23)$$

Further, the following equation (24) can be obtained.

$$i_{SS} = A_S \frac{\rho_2}{D_2^2} \quad (24)$$

where $i_{SS}$ is a COM signal current flowing at the time of spot AF and $i_{SS} = i_{1S} + i_{2S}$. Thus, $$\frac{\rho_2}{D_2^2} = \frac{i_{SS}}{A_S}$$

can be obtained form the above equation (24), and as a result, $$\frac{\rho_2}{D_2^2}$$

an be determined from the result of the light amount integration (in this case, the reason why the value of A is set to different values $A_S$ and $A_M$ (both of them are constants) respectively when only the spot light emitting section is driven and when both of the spot and area light emitting sections are driven is that the light emission intensity $dP_O/d\Omega$ is different in the respective cases). Therefore, the relation between $1/D_M$ and $i_{SM}$ obtained in the area AF operation (distance measurement by the spot and area light emitting section) and $1/D_S$ and $i_{SS}$ obtained in the spot AF operation (distance measurement by the spot light emitting section) can be expressed by the following equation (25), that is, the following equation (25) can be obtained by rearranging the equations (21), (22), (23) and (24).

$$\frac{1}{D_M} = \frac{1}{D_1} - \frac{h_2 \frac{i_{SS}}{A_S}}{\frac{i_{SM}}{A_M}}\left(\frac{1}{D_1} - \frac{1}{D_S}\right) \quad (25)$$

The following equations (26) and (27) can be obtained by rewriting the equation (25) with respect to $1D_1$.

$$\frac{1}{D_1} = \frac{\frac{1}{D_M} - h_2\left(\frac{i_{SS}}{A_S}\right) \times \left(\frac{A_M}{i_{SM}}\right) \times \frac{1}{D_S}}{1 - h_2 \frac{i_{SS}}{A_S} \times \frac{A_M}{i_{SM}}} \quad (26)$$

$$= \frac{\frac{1}{D_M} - k\frac{1}{D_S}}{1 - k} \quad (27)$$

where $k = \frac{i_{SS}}{A_S} \cdot \frac{A_M}{i_{SM}} \cdot h_2$

The term whose value is unknown in the above equations is only $h_2$, that is, only the ratio of the background to the entire light projected range. Therefore, if a certain value is hypothetically set as $h_2$, a value of $1/D_1$ can be estimated. Of course, in the actual photographing, the value of $h_2$ is not constant, but there will occur no problem if the amount of erroneous determination of $1/D_1$ is small enough and gives no serious influence on the photograph.

Assuming now that $h_2$ is a fixed value and $1/D_X$ is derived as the value of $1/D_1$ when calculated based on $h_2$, then the following equation (28) can be obtained from the equation (27).

$$\frac{1}{D_X} = \frac{\frac{1}{D_M} - k\frac{1}{D_S}}{1-k} \quad (28)$$

FIG. 8 shows variation in the amount of erroneous determination of distance $\Delta(1/D)=(1/D_X)-(1/D_1)$ according to variation in the actual value of $h_2$ when the distance $D_1$ to the person is 2m, $\rho_1=0.4$, the distance $D_2$ to the wall is 4m, $\rho_2=0.6$, and $h_2=0.5$.

Figure 9:
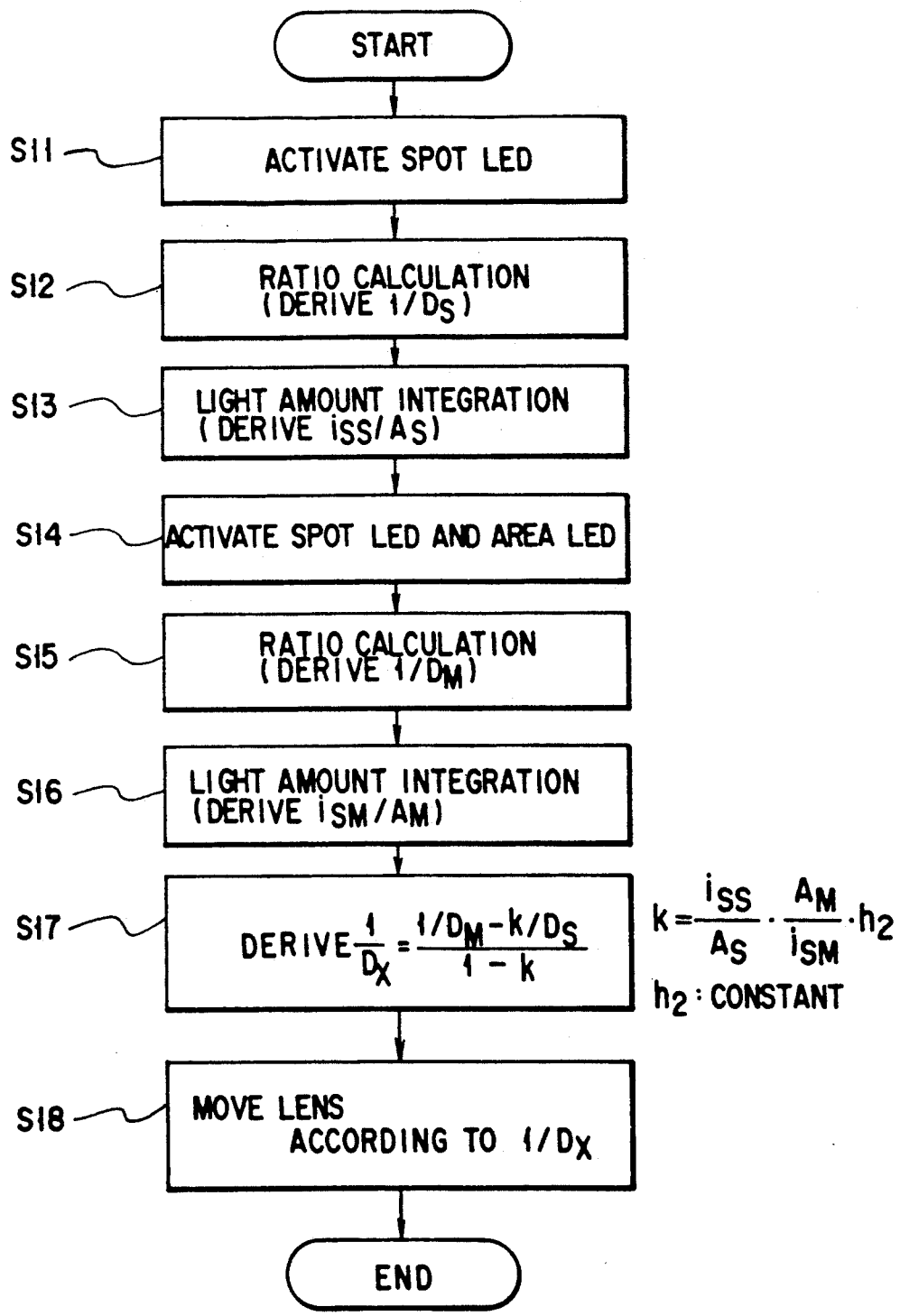
FIG. 9 is a control flowchart used in the first embodiment.

FIG. 9 is a control flowchart showing the operation of the first embodiment. First, the spot LED (light emitting section) 3A is activated (step S11) so as to derive the ratio calculation distance $1/D_S$ and the light amount integration result $i_{SS}/A_S$ (steps S12 and S13). Next, both of the spot LED 3A and area LED 3B are simultaneously driven (step S14) to derive $1/D_M$ and $i_{SM}/A_M$ (steps S15 and S16). Then, $1/D_X$ is derived according to the equation (28) (step S17) and the lens is moved by an amount corresponding to the derived value (step S18).

Next, the second embodiment of this invention is explained. In the first embodiment, $1/D_X$ is always derived from the values of $1/D_M$, $i_{SM}/A_M$, $1/D_S$ and $i_{SS}/A_S$, but in the second embodiment, it is determined based on the relation between $1/D_S$ and $1/D_M$.

Figures 10A, 10B:
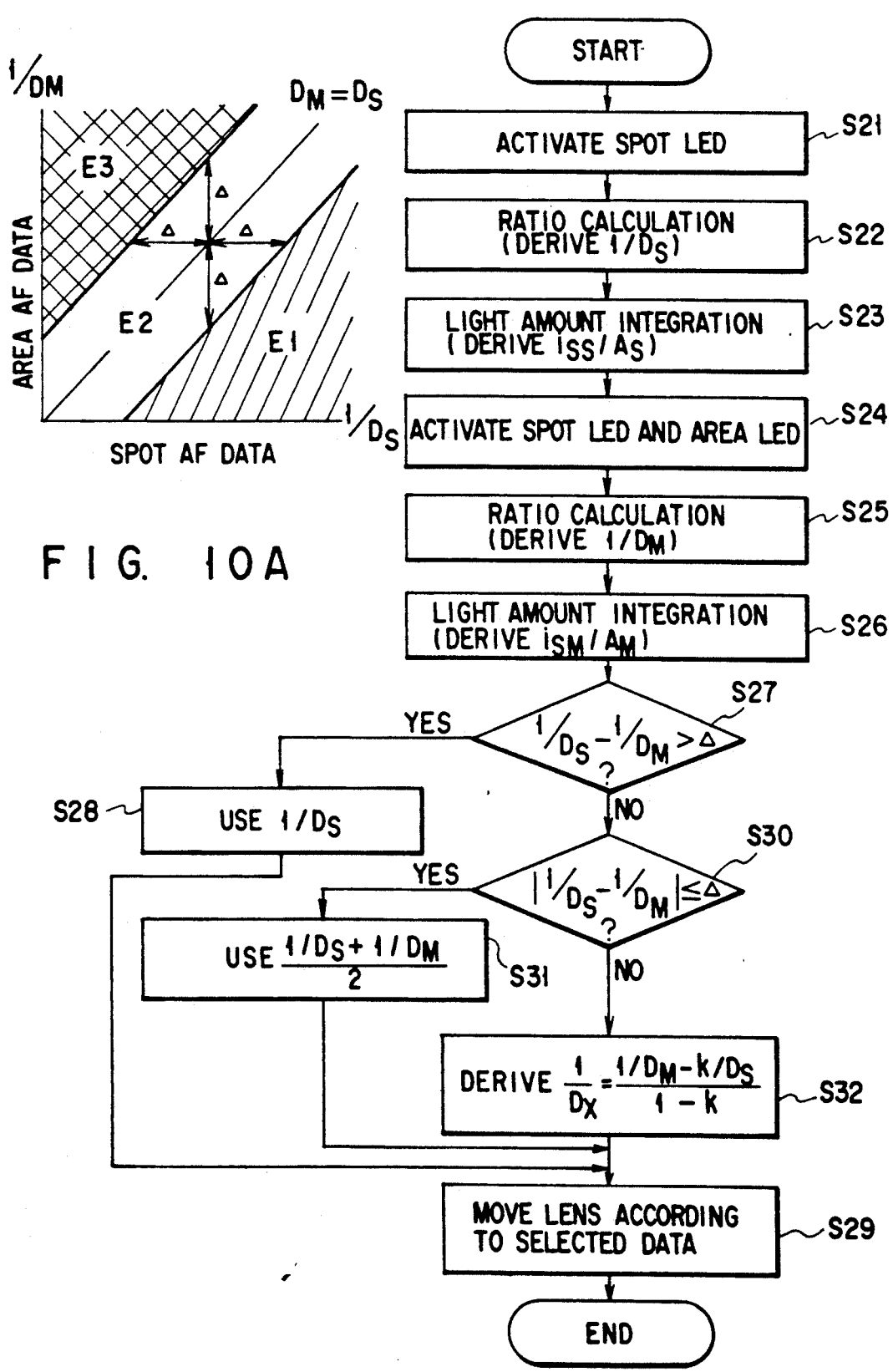
FIG. 10A is a diagram showing the relation between the result of ratio calculation of the distance measurement made by use of only a spot light emitting section and the result of ratio calculation of the distance measurement made by use of only spot and area light emitting sections.
FIG. 10B is a control flowchart used in the second embodiment.

FIG. 10A shows the relation between the ratio calculation result $1/D_S$ obtained in the spot AF operation (distance measurement only for the central portion) and the ratio calculation result $1/D_M$ obtained in the area AF operation (distance measurement by the spot and area light emitting sections). In this case, the area is divided into the following three portions:

$$E1: \frac{1}{D_S} - \frac{1}{D_M} > \Delta$$

$$E2: -\Delta \leq \frac{1}{D_S} - \frac{1}{D_M} \leq \Delta$$

$$E3: \frac{1}{D_S} - \frac{1}{D_M} < -\Delta \text{ that is, } \frac{1}{D_M} - \frac{1}{D_S} > \Delta$$

where $\Delta > 0$ and, for example, $\Delta$ is set to a value corresponding to 1m.

In general, the possibility that the main subject is placed at the central position of an image is high and the possibility that the main subject is set at the nearest distance is high. Therefore, as in the area E1 in FIG. 10A, when the distance $D_S$ in the central portion is extremely shorter than the distance $D_M$ derived by the area AF operation, the lens is moved according to the data $1/D_S$. Further, as in the area E2, when $(1/D_S)-(1/D_M)$ is equal to or less than $\Delta$, the main subject and the background are located at a short distance so that either $D_S$ or $D_M$ may be used, but since the relation between the magnitudes of $D_S$ and $D_M$ may by invertedly determined by variation of the AFIC 6, the average value thereof is derived and the lens is moved to the position of $\{(1/D_S)+(1/D_M)\}/2$. As in the area E3, when $(1/D_S)-(1/D_M)<-\Delta$, it is considered that the main subject is not placed at the central position and therefore $1/D_X$ is derived according to the equation (28) and the lens is moved according to the derived value.

FIG. 10B is a control flowchart for the above operation.

That is, the spot LED (light emitting section) 3A is first activated (step S21) so as to derive the ratio calculated distance $1/D_S$ and the light amount integration result $i_{SS}/A_S$ (steps S22 and S23). Next, both of the spot LED 3A and area LED 3B are simultaneously driven (step S24) to derive $1/D_M$ and $i_{SM}/A_M$ (steps S25 and S26).

Then, whether or not $(1/D_S)-(1/D_M)$ is larger than $\Delta$ is determined (step S27), and when it is larger than $\Delta$, that is, when the distance $D_S$ in the central portion is extremely shorter than the distance $D_M$ derived by the area AF operation data of $1/D_S$ is used (step S28) and the lens is moved according to the data $1/D_S$ (step S29).

If it is detected in the step S27 that $(1/D_S)-(1/D_M)$ is smaller than $\Delta$, whether or not $|(1/D_S)-(1/D_M)|$ is equal to or less than $\Delta$ is checked (step S30). When it is equal to or less than $\Delta$, data of $\{(1/D_S)+(1/D_M)\}/2$ is used (step S31) and the lens is moved to the position indicated by the data (step S29).

If it is detected in the step S30 that $(1/D_S)-(1/D_M)$ is larger than $\Delta$, $1/D_X$ is derived according to the equation (28) (step S32) and the lens is moved according to the derived value (step S29).

In the first and second embodiments, the area light emitting section 3B illuminates a relatively wide range $\theta_M'$ in the y-axis direction when driven. Since the reflected spot image moves in a direction vertical to the base length direction, outputs of PSDs 4L and 4R will not vary and the problem of movement of the subject 5 in the y-axis direction may be solved by simply setting the width W of the PSDs 4L and 4R to a large value.

In this case, if the nearest distance is $L_N$, the base length is S, the focal distance of the light reception lens is $f_j$, then the width W is preferably set to $2S \cdot f_j/L_N$. When the width W is set to be too large, S/N will be deteriorated, and when the width W is set to be too small, the spot eclipse in the vertical direction will occur.

Figure 11:
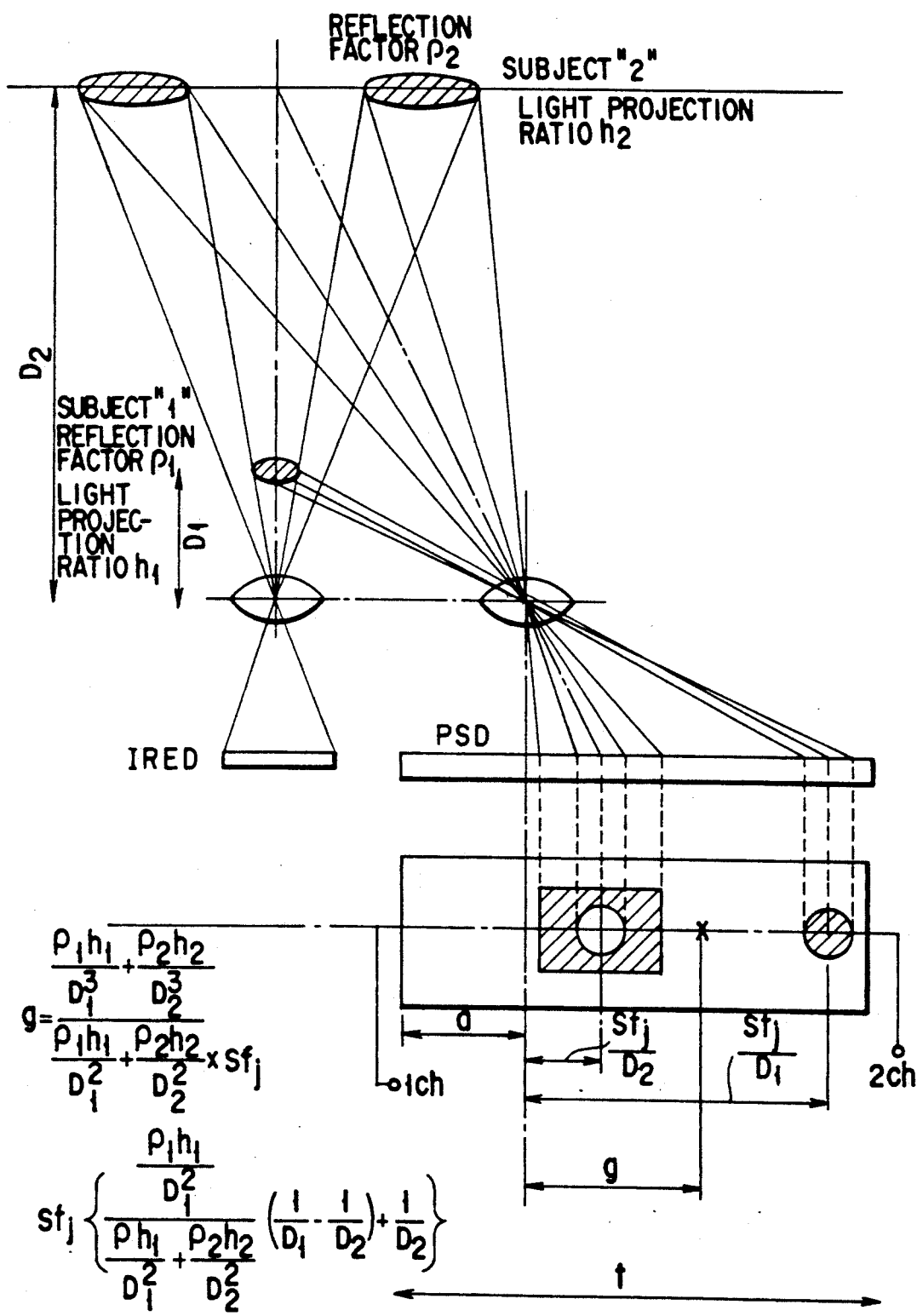
FIG. 11 is a diagram showing the position of a reflected spot of the main subject and the background and the position of the centroid of the entire portion thereof.

FIG. 11 shows the reflected spot positions of the main subject and background and the centroid position of the entire portion.

Figures 12A, 12B:
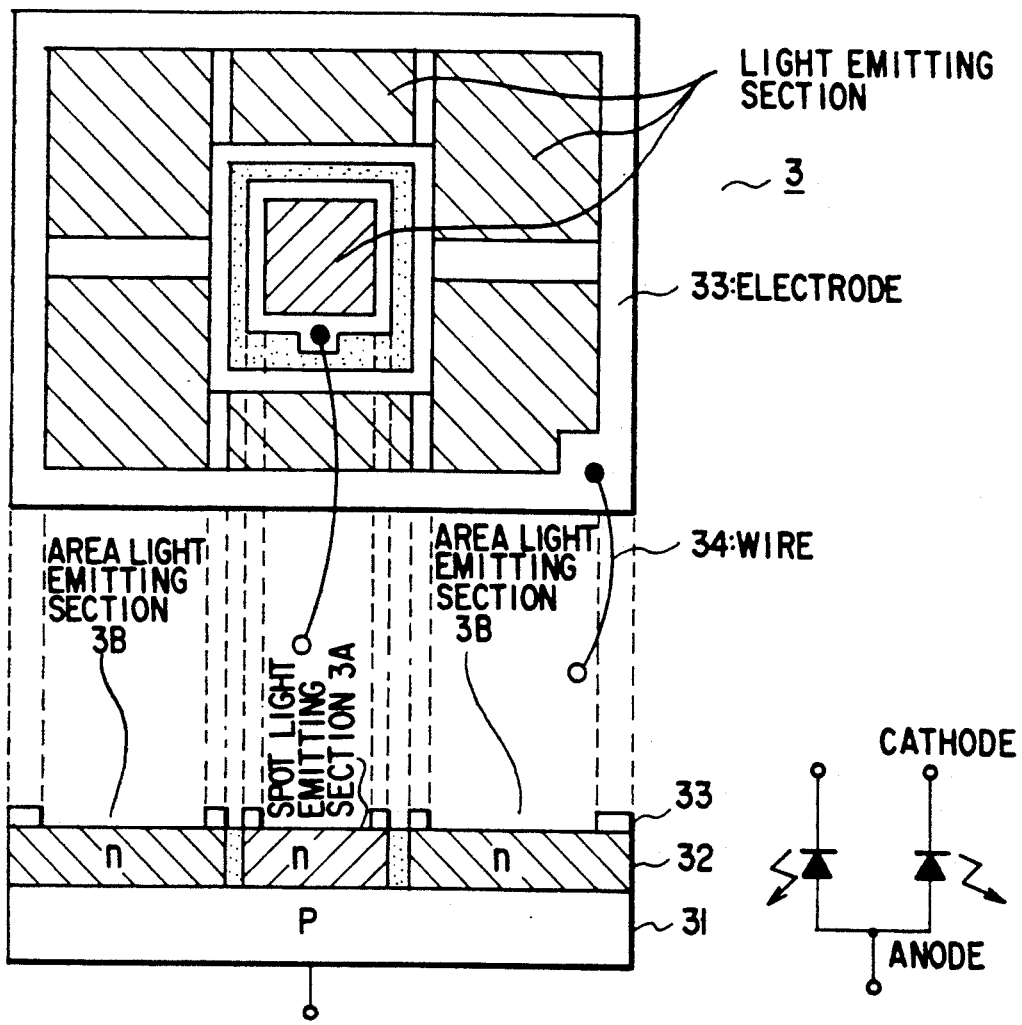
FIG. 12A shows a combination of plan view and front view of an IRED divided into spot and area light emitting sections.
FIG. 12B is a diagram showing the circuit representation thereof.

FIG. 12A shows a combination of plan view and front view of an IRED divided into spot and area light emitting sections, and FIG. 12B is a diagram showing the circuit representation thereof.

The IRED 3 includes divided n-type layers 32 formed on a p-type substrate 31 and an electrode 33 formed on the n-type layer 32. Metal wires 34 are used to lead terminals to the exterior. The electrode 33 is arranged in a complicated form in the area light emitting section 3B because the light emitting efficiency is lowered in a portion lying at a distance from the electrode when the electrode is arranged only on the peripheral portion.

Figure 13:
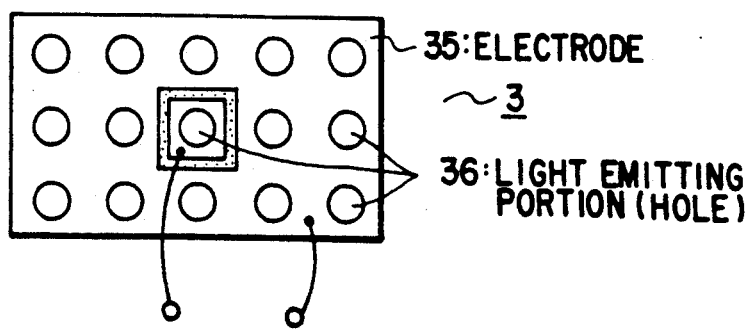
FIG. 13 is a plan view showing a modification of the IRED.

FIG. 13 shows a modification of the IRED 3. In the IRED 3, circular holes 36 are formed in a plurality of portions of an electrode of the area light emitting section 3B and light is emitted from the holes.

Figure 14A:
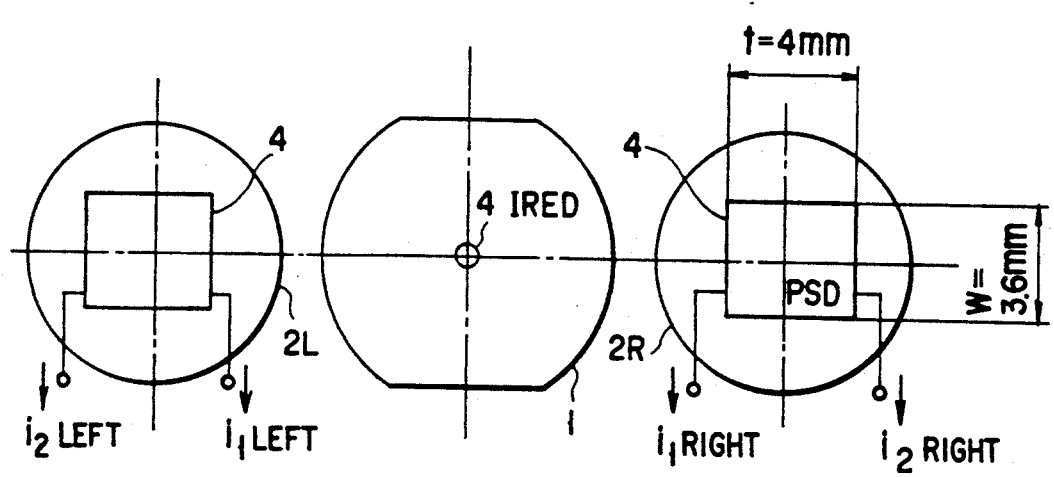
FIG. 14A is a front view of a modification of the optical arrangement and FIG. 14B is a plan view thereof.
Figure 14B:
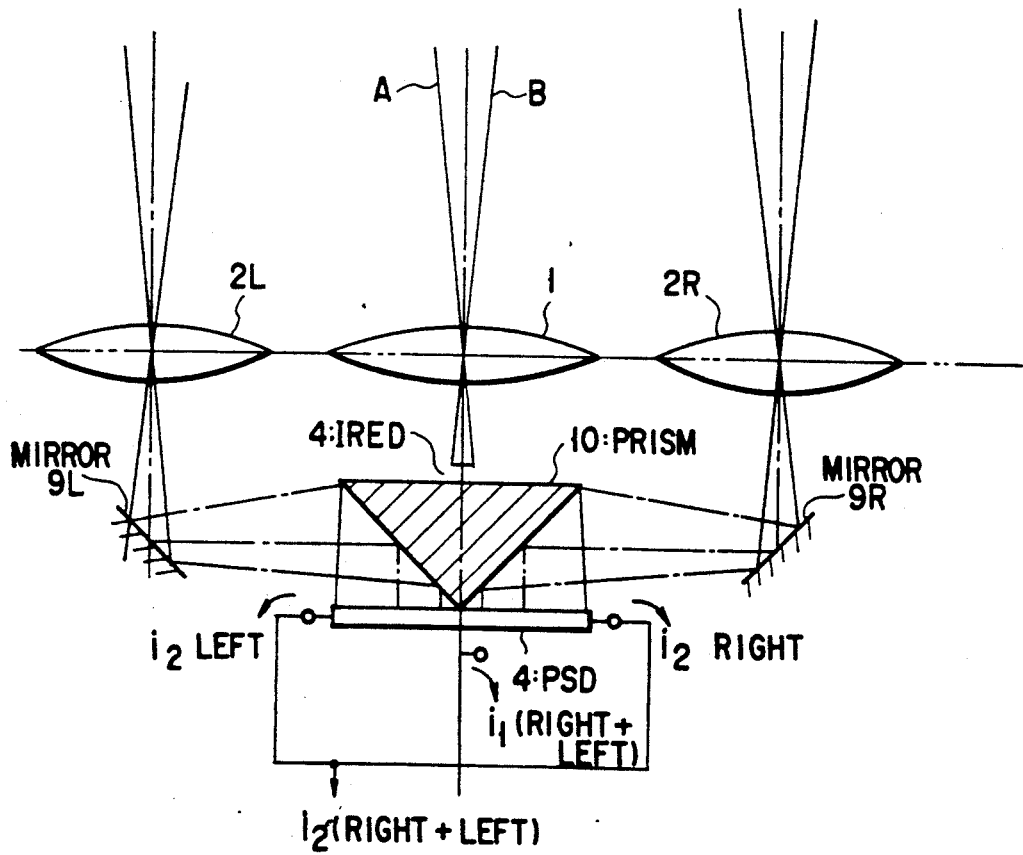

FIGS. 14A and 14B show an example in which the optical axes are is bent by use of mirrors 9L and 9R and a prism 10 in order to reduce the size of the optical system. In the former embodiments, two PSDs are necessary, but in this embodiments, it is only necessary to use one PSD 4 having two second channels obtained by bending the optical axes.

FIG. 15 shows a case wherein the base lengths and the focal distances of the light reception lenses 2L and 2R are different from each other. In the former embodiments, the base length S and the focal distances $f_j$ of the reception lenses 2L and 2R are set equal to each other and therefore the 1-ch portions and the 2-ch portions of the right and left PSDs are respectively connected together, but when optical constants in the right and left optical systems are different from each other, the current relations in the right and left optical systems are expressed by the following equation (29).

$$\frac{i_{2L}}{i_{1L} + i_{2L}} = \frac{1}{t}\left(\frac{S_L f_L}{D} + a\right) \\ \frac{i_{2R}}{i_{1R} + i_{2R}} = \frac{1}{t}\left(\frac{S_R f_R}{D} + a\right) \quad (29)$$

When the subject is disposed at a distance $\Delta X$ from the optical axis, then the current relations in the right and left optical systems are expressed by the following equation (30).

$$\frac{i_{2L}}{i_{1L} + i_{2L}} = \frac{1}{t}\left(\frac{(S_L + \Delta X)f_L}{D} + a\right) \\ \frac{i_{2R}}{i_{1R} + i_{2R}} = \frac{i}{t}\left(\frac{(S_R - \Delta X)f_R}{D} + a\right) \quad (30)$$

Therefore, even if the 1-ch portions and the 2-ch portions of the right and left PSDs are respectively connected together, the term $\Delta x$ is not cancelled. In this case, if a circuit for multiplying the signal current in the 2-ch portion of the PSD-R by $f_L/f_R$ is used, the following equation can be obtained.

$$\frac{i_{2R}}{i_{1R} + i_{2R}} = \frac{1}{t}\left(\frac{(S_R - \Delta X)f_R}{D} \times \frac{f_L}{f_R} + a \times \frac{f_L}{F_R}\right)$$

In this case, if the each channel portions of the right and left PSDs are added to each other ($i_{1L}+i_{2L}=i_{1R}+i_{2R}=i_S$), the following equation (31) can be obtained.

$$\frac{i_{2L} + i_{2R}}{i_S} = \frac{1}{t}\left(\frac{(S_L + S_R)f_L}{D} + a\left(1 + \frac{f_L}{f_R}\right)\right) \quad (31)$$

Thus, $\Delta x$ can be cancelled and $1/D$ can be derived.

In this case, however, the current signals of the right and left PSDs must be separately processed by the AFIC 6.

As described above, according to this invention, the distance measurement can be made for a wide range. That is, even if the subject is set in any position in the x and y directions, a picture which is good as far as the focusing is concerned can be photographed and a picture can be photographed with much importance put on the central portion thereof in which the main subject is set with high possibility.

As described above, according to this invention, a distance measuring apparatus capable of eliminating the influence by the spot eclipse and measuring the distance in a wide range can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A distance measuring apparatus comprising:

light projection means for selectively setting into a first light emitting state for projecting light onto an area of relatively narrow range and a second light emitting state for projecting light onto an area of a range which is wider than the range of the first light emitting state;

a pair of optical position detecting means arranged with said light projecting means disposed therebetween, each of said optical position detecting means including a pair of electrodes and outputting signal currents corresponding to the incident position of light which has been projected and reflected from a subject; and distance deriving means for deriving the distance $(1/D_1)$ to the subject according to the equation of $$\frac{1}{D_1} = \frac{\frac{1}{D_M} - \frac{k}{D_S}}{1 - k}$$

(where $k=$ $$\frac{i_{SS}}{A_S} \cdot \frac{A_M}{i_{SM}} \cdot h_2,$$

$A_S$ and $A_M$ are constants, and $h_2$ is the ratio of an area occupied by the subject with respect to the entire illuminated range) based on a value $(1/D_S)$ dependent on the ratio of the signal currents derived from the electrodes of said optical position detecting means and a value ($i_{ss}$) dependent on the sum of the signal currents in the first light emitting state and based on a value $(1/D_M)$ dependent on the ratio of the signal currents derived from the electrodes of said optical position detecting means and a value ($i_{sM}$) dependent on the sum of the signal currents in the second light emitting state.

2. The distance measuring apparatus according to claim 1, wherein said light projecting means includes a light projecting lens and a light emitting element disposed with the center thereof aligned with the optical axis of said light projecting lens, said light emitting element having a spot light emitting section for illuminating a portion only near the optical axis and an area light emitting section for illuminating a wide range.

3. The distance measuring apparatus according to claim 2, wherein said distance deriving means derives the value $(1/D_S)$ dependent on the ratio of the signal currents derived from the electrodes of said optical position detecting means and the value ($i_{SS}$) dependent on the sum of the signal currents in a state in which said spot light emitting section is activated, and derives the value $(1/D_M)$ dependent on the ratio of signal currents derived from the electrodes of said optical position detecting means and the value ($i_{SM}$) dependent on the sum of the signal currents in a state in which said spot light emitting section and said area light emitting section are activated.

4. The distance measuring apparatus according to claim 1, wherein said pair of optical position detecting means includes a pair of position sensing devices (PSDs) formed on the same substrate; and a prism for guiding the projected light incident on the subject via a pair of light reception lenses and reflected from the subject towards said pair of PSDs.

5. A distance measuring apparatus comprising:

light projection means for selectively setting into a first light emitting state for projecting light onto an area of relatively narrow range and a second light emitting state for projecting light onto an area of a range which is wider than the range of the first light emitting state;

a pair of optical position detecting means arranged with said light projecting means disposed therebetween;

first deriving means for deriving a value ($1/D_S$) dependent on the ratio of the signal currents derived from respective electrodes of said optical position detecting means in the first light emitting state and a value ($1/D_M$) dependent on the ratio of signal currents derived from the electrodes of said optical position detecting means in the second light emitting state;

comparing means for comparing the two values dependent on the ratio of the signal currents derived by said first deriving means with each other; and distance determining means for determining the distance to the subject based on the result of comparison by said comparing means.

6. The distance measuring apparatus according to claim 1, further comprising second deriving means for deriving a value ($i_{SS}$) dependent on the sum of the signal currents derived from the respective electrodes of said optical position detecting means in the first light emitting state and a value ($i_{SM}$) dependent on the sum of the signal currents derived from the respective electrodes of said optical position detecting means in the second light emitting state, and wherein said distance determining means selects $1/D_S$ as the distance to the subject when the result of comparison by said comparing means indicates that $(1/D_S)-(1/D_M)>\Delta$ ($\Delta$ is a predetermined amount), selects $[(1/D_S)+(1/D_M)]/2$ as the distance to the subject when $|(1/D_S)-(1/D_M)|\leq\Delta$, and derives the distance ($1/D_1$) to the subject in the other case according to $$\frac{1}{D_1} = \frac{\frac{1}{D_M} - \frac{k}{D_S}}{1-k}$$

where $$k = \frac{i_{SS}}{A_S} \cdot \frac{A_M}{i_{SM}} \cdot h_2,$$

$A_S$ and $A_M$ are constants, and $h_2$ is the ratio or an area occupied by the subject with respect to the entire illuminated range.

7. A distance measuring apparatus comprising:

light projection means for selectively setting into a first light emitting state for projecting light onto an area of relatively narrow range and a second light emitting state for projecting light onto an area of a range which is wider than the range of the first light emitting state;

a first optical position detecting element, disposed at a distance of base length from said light projection means, for receiving light which is projected from said light projection means onto the subject and reflected from the subject, said first optical position detecting element outputting signal currents from a pair of electrodes according to the light incident position;

a second optical position detecting element, disposed on the opposite side of said first optical position detecting element with respect to said light projection means, at a distance of the base length from said light projection means, for receiving light which is projected from said light projection means onto the subject and reflected from the subject, said second optical position detecting element outputting signal currents from a pair of electrodes according to the light incident position;

first deriving means for deriving a first signal current from one of the paired electrodes of said first optical position detecting means and one of the paired electrodes of said second optical position detecting means, deriving a second signal current from the other of the paired electrodes of said first optical position detecting means and the other of the paired electrodes of said second optical position detecting means, and deriving the ratio of the first and second signal currents;

second deriving means for deriving a value corresponding to the sum of the first and second signal currents; and distance determining means for determining the distance to the subject based on outputs of said first and second deriving means in the first light emitting state and outputs of said first and second deriving means in the second light emitting state.

8. The distance measuring apparatus according to claim 7, wherein outputs of said first and second deriving means in the first light emitting state are respectively expressed by $1/D_S$ and $i_{SS}$, and outputs of said first and second deriving means in the second light emitting state are respectively expressed by $1/D_M$ and $i_{SM}$, said distance determining means determines the distance ($1/D_1$) to the subject according to the equation of $$\frac{1}{D_1} = \frac{\frac{1}{D_M} - \frac{k}{D_S}}{1-k}$$

where $$k = \frac{i_{SS}}{A_S} \cdot \frac{A_M}{i_{SM}} \cdot h_2,$$

$A_S$ and $A_M$ are constants, and $h_2$ is the ratio of an area occupied by the subject with respect to the entire illuminated range.

9. The distance measuring apparatus according to claim 7, further comprising comparing means for comparing the result of the deriving operation by said first deriving means in the first light emitting state and the result of the deriving operation by said first deriving means in the second light emitting state, and wherein said distance determining means determines the distance to the subject according to the magnitude relation between the results of said first and second deriving means derived by said comparing means.

10. The distance measuring apparatus according to claim 9, wherein outputs of said first and second deriving means in the first light emitting state are respectively expressed by $1/D_S$ and $i_{SS}$, and outputs of said first and second deriving means in the second light emitting state are respectively expressed by $1/D_M$ and $i_{SM}$, said distance determining means selects $1/D_S$ as the distance to the subject when the result of comparison by said comparing means indicates that $(1/D_S)-(1/D_M)>\Delta$ ($\Delta$ is a predetermined amount), selects $[(1/D_S)+(1/D_M)]/2$ as the distance to the subject when $(1/D_S)-(1/D_M)\leq\Delta$, and derives the distance $(i/D_1)$ to the subject in the other case according to the equation of $$\frac{1}{D_1} = \frac{\frac{1}{D_M} D_S}{1-k}$$

where $$k = \frac{i_{SS}}{A_S} \cdot \frac{A_M}{i_{SM}} \cdot h_2.$$

$A_S$ and $A_M$ are constants, and $h_2$ is the ratio of an area occupied by the subject with respect to the entire illuminated range.

11. A distance measuring apparatus for camera comprising:

light emitting means for selectively setting into a first light emitting state for emitting distance measuring light to only part of a distance measuring area and a second light emitting state for emitting distance measuring light to the entire portion of the distance measuring area;

light reception means having a pair of optical position detecting elements arranged with said light emitting means disposed therebetween, for receiving distance measuring light which is projected from said light emitting means onto the subject and reflected from the subject and supplying outputs corresponding to the light receiving position from two electrodes;

light emission controlling means for selecting the light emitting state of said light emitting means and causing said light emitting means to emit the distance measuring light plural times;

output generating means for combining the outputs from said light reception means, and generating first and second output values obtained by integrating outputs which are respectively dependent on the ratio and sum of the outputs from the respective electrodes of said pair of optical position detecting elements in response to the illumination of distance measuring light by said light emission controlling means; and deriving means for determining a distance to the subject based on the first and second output values generated from said output generating means when said light emitting means is set in the first light emitting state and the first and second output values generated from said output generating means when said light emitting means is set in the second light emitting state.

12. The distance measuring apparatus according to claim 11, wherein said deriving means has a plurality of equations for deriving the distance to the subject and includes means for comparing the first output value generated from said output generating means when said light emitting means is set in the first light emitting state with the first output value generated from said output generating means when said light emitting means is set in the second light emitting state and selecting one of said plurality of equations according to the result of comparison.

13. The distance measuring apparatus according to claim 11, wherein said light emitting means includes a light emitting element constructed by a plurality of light emitting sections and an electrode formed to surround said plurality of light emitting sections, the light emitting section lying at the central portion of said light emitting means is activated in the first light emitting state, and all of said plurality of light emitting sections are activated in the second light emitting state.

14. A distance measuring apparatus for camera comprising:

light emitting means for selectively setting into a first light emitting state for emitting distance measuring light to only part of a distance measuring area and a second light emitting state for emitting distance measuring light to the entire portion of the distance measuring area;

light reception means having a pair of light reception lenses arranged with said light emitting means disposed therebetween and a pair of optical position detecting elements for receiving light beams received by said light reception lenses, for receiving light which is projected from said light emitting means onto the subject and reflected from the subject by said light reception lenses and for generating outputs corresponding to the light receiving position from said pair of optical position detecting elements; and deriving means for deriving a distance to the subject based on the output from said light reception means, said deriving means deriving the distance to the subject according to the output generated from said light reception means when said light emitting means is set in the first light emitting state and the output generated from said light reception means when said light emitting means is set in the second light emitting state.

15. The distance measuring apparatus according to claim 14, wherein said light emitting means includes a light emitting element constructed by a plurality of light emitting sections and an electrode formed to surround said plurality of light emitting sections, the light emitting section lying at the central portion of said light emitting means is activated in the first light emitting state, and all of said plurality of light emitting sections are activated in the second light emitting state.

16. The distance measuring apparatus according to claim 14, wherein said light reception means outputs currents corresponding to the light receiving position from respective electrodes of said optical position detecting elements; and said deriving means derives first and second output values which are respectively dependent on the ratio and sum of the currents obtained from the electrodes of said optical position detecting elements when said light emitting means is set in the first light emitting state, derives third and fourth output values which are respectively dependent on the ratio and sum of the currents obtained from the electrodes of said optical position detecting elements when said light emitting means is set in the second light emitting state, and derives the distance to the subject based on the above four output values.

17. The distance measuring apparatus according to claim 16, wherein said deriving means has a plurality of equations used for deriving the distance to the subject and includes means for comparing the first output value with the third output value and selecting one of said plurality of equations according to the result of comparison.

18. The distance measuring apparatus according to claim 14, wherein said light reception means includes means for deflecting light beams incident on said light reception lenses and the light beams deflected by said deflection means are input to said pair of optical position detecting elements.

19. A distance measuring apparatus for camera comprising:
light emitting means for selectively setting into a first light emitting state for emitting distance measuring light onto a preset area and a second light emitting state for emitting distance measuring light onto a wide angle area containing the preset area illuminated in the first light emitting state;
light reception means for receiving light which is projected from said light emitting means onto the subject and reflected from the subject, and outputting an output corresponding to the received light position; and
determining means for determining the distance to the subject based on the output from said light reception means, said determining means determining the distance to the subject based on an output generated from said light reception means when said light emitting means is set in the first light emitting state and an output generated from said light reception means when said light emitting means is set in the second light emitting state.

20. The distance measuring apparatus according to claim 19, wherein said light emitting means includes a light emitting element constructed by a plurality of light emitting sections and an electrode formed to surround said plurality of light emitting sections, only the light emitting section lying at the central portion of said light emitting means is activated in the first light emitting state, and all of said plurality of light emitting sections are activated in the second light emitting state.

21. The distance measuring apparatus according to claim 19, wherein said light reception means has a light reception lens arranged at a distance of base length from said light emitting means and an optical position detecting element for receiving a light beam received by said light reception lens, said light reception lens receiving light which is projected from said light emitting means onto the subject and reflected from the subject and said optical position detecting element supplying outputs corresponding to the light receiving position from electrodes thereof; and said determining means derives first and second output values which are respectively dependent on the ratio and sum of the currents derived from the electrodes of said optical position detecting means when said light emitting means is set in the first state and derives third and fourth output values which are respectively dependent on the ratio and sum of the currents derived from the electrodes of said optical position detecting means when said light emitting means is set in the second state and determines the distance to the subject based on the four output values.

22. The distance measuring apparatus according to claim 19, wherein said determining means has a plurality of equations for deriving the distance to the subject and includes means for comparing a first output value generated from said output generating means when said light emitting means is set in the first light emitting state with a second output value generated from said output generating means when said light emitting means is set in the second light emitting state and selecting one of said plurality of equations according to the result of comparison.

* * * * *